United States Patent [19]

Oishi et al.

[11] Patent Number: 4,682,260
[45] Date of Patent: Jul. 21, 1987

[54] MAGNETIC DISK CARTRIDGE

[75] Inventors: Kengo Oishi; Osamu Suzuki, both of Odawara, Japan

[73] Assignee: Fuji Photo Film Co., Ltd., Japan

[21] Appl. No.: 600,434

[22] Filed: Apr. 16, 1984

[30] Foreign Application Priority Data

Apr. 22, 1983 [JP] Japan .................... 58-60451[U]

[51] Int. Cl.[4] ............................................ G11B 23/03
[52] U.S. Cl. ................................... 360/133; 360/132; 206/444
[58] Field of Search ................ 360/132–133, 360/97–99, 137, 86; 206/444; 242/198–199

[56] References Cited

U.S. PATENT DOCUMENTS 4,511,944  4/1985  Saito ........................... 360/133
4,546,397  10/1985 Asami et al. .................. 360/133

FOREIGN PATENT DOCUMENTS 58-125275   7/1983  Japan ........................... 360/133
58-203680  11/1983  Japan ........................... 360/99
59-72687    4/1984  Japan ........................... 360/97
2113890     8/1983  United Kingdom ............ 360/133
2143072     1/1985  United Kingdom ............ 360/133

Primary Examiner—John H. Wolff
Assistant Examiner—Matthew J. Bussan
Attorney, Agent, or Firm—Gerald J. Ferguson, Jr.; Michael P. Hoffman; Ronni S. Malamud

[57] ABSTRACT

A magnetic disk cartridge comprises a case rotatably housing a magnetic disk, and a shutter slidably fitted onto the case for opening and closing window sections provided in the case for insertion of a magnetic head. The shutter is always urged by a spring to close the window sections. At least one end of the spring is secured to an engagement member having approximately cylindrical protrusions which are fitted into grooves positioned for resilient deformation in the case or in the shutter.

5 Claims, 6 Drawing Figures

MAGNETIC DISK CARTRIDGE

BACKGROUND OF THE INVENTION

1. Field of the Invention

This invention relates to a magnetic disk cartridge. This invention particularly relates to a magnetic disk cartridge comprising a small-diameter, very thin magnetic disk which is rotated at a high speed for recording and reproducing of image information or the like.

2. Description of the Prior Art

Floppy disks are widely used as recording media for computers because they are easy to handle and low in cost. The floppy disk comprises a disk-like base made of a flexible polyester sheet or the like, and magnetic material layers overlaid on opposite surfaces of the disk-like base. The floppy disk is rotated at a high speed for magnetically recording information in the magnetic material layers by use of a magnetic head.

On the other hand, by utilizing the aforesaid advantages of the floppy disk and the advantage that a magnetic recording medium has over silver halide photographic films in that the magnetic recording medium can be reused, it has been proposed to use a magnetic disk having a size smaller than the size of the floppy disk as an image recording medium in still cameras. The magnetic disk used for still cameras comprises a small-diameter, very thin magnetic recording medium, and a hub secured to the center of the magnetic recording medium. The magnetic disk is rotatably housed in a small, hard case provided at the center thereof with a hub hole for exposing the hub of the magnetic disk. The case also has magnetic head insertion apertures for exposing a part of the magnetic disk in the front surface and the rear surface of the case. The combination of the magnetic disk with the case is called a magnetic disk cartridge.

The magnetic disk cartridge of the aforesaid type is provided with a shutter for closing the window sections, through which is inserted a magnetic head, for the purpose of protecting the surfaces of the magnetic disk. The shutter has a U-shaped cross-section and is fitted onto the case so as to grasp the upper and lower surfaces of the case in a manner slidable in a direction approximately normal to the depth direction of the apertures of the window sections. The shutter is urged by a spring member to close the window sections when the magnetic disk is not used for recording and reproducing.

The configuration of the conventional magnetic disk cartridge will further be described with reference to FIGS. 1, 2 and 3.

FIG. 1 is a partial perspective view showing the configuration of the shutter section of the conventional magnetic disk cartridge, and FIG. 2 is a cross-sectional view showing a part of the cross-section taken along line A—A of FIG. 1. A case 1 comprises an upper case half 1a and a lower case half 1b, which have window sections 1c (only one shown) for insertion of a magnetic head in the vicinity of one edge portion of the case 1. Around the window sections 1c are provided step-like sections 1d for receiving the upper side and the lower side of a shutter 2. Thus the window sections 1c and the step-like sections 1d are symmetrically positioned in the upper case half 1a and the lower case half 1b. The shutter 2 is slidably fitted onto the case 1 so as to grasp the step-like sections 1d. The shutter 2 is provided with window sections 2a (only one shown) which are aligned with the window sections 1c when the shutter 2 is positioned in a predetermined sliding position. The lower case half 1b has a pin 1e fabricated integrally with the lower case half 1b in the vicinity of the edge portion of the lower case half 1b where the step-like section 1d exists. Further, the shutter 2 has a hook 2b fabricated integrally therewith. Between the pin 1e and the hook 2b is positioned a spring 3 for urging the shutter 2 to close the window sections 1c.

When the magnetic disk cartridge having the configuration as described above is assembled, one end of the spring 3 is engaged with the pin 1e provided on the lower case half 1b. The upper case half 1a is aligned with the lower case half 1b from above and mounted thereon so that the spring 3 is grasped between the upper case half 1a and the lower case half 1b. Then, the upper case half 1a and the lower case half 1b are secured to each other by ultrasonic fusion or the like. The other end of the spring 3 is then engaged with the hook 2b provided on the shutter 2, and the shutter 2 is fitted onto the step-like sections 1d of the case 1.

In the aforesaid assembly method, since the spring 3 must be engaged with the lower case half 1b before securing the upper case half 1a to the lower case half 1b and must be engaged with the shutter 2 after the securing step, the efficiency of the assembly work is low and the spring 3 readily disengages from the case half 1b and/or the shutter 2.

FIG. 3 is a partial perspective view showing another configuration of the shutter of the conventional magnetic disk cartridge. In FIG. 3, a hook 1f is provided on at least one of the upper case half 1a and the lower case half 1b. After the upper case half 1a is secured to the lower case half 1b, one end of the spring 3 is engaged with the hook 1f, and the other end thereof is engaged with the hook 2b of the shutter 2. Thereafter, the shutter 2 is fitted onto the case 1. Since securing of the upper case half 1a and the lower case half 1b to each other is conducted by ultrasonic fusion or the like before engagement of the spring 3 with the case 1 and the shutter 2, this method is advantageous from the viewpoint of protecting the magnetic disk cartridge from dust and the efficiency of the assembly work. However, since the ends of the spring 3 are simply hooked on the hooks 1f and 2b, the method has the drawback that the spring 3 will readily separate from the hooks 1f and 2b due to vibration during the assembly work.

SUMMARY OF THE INVENTION

The primary object of the present invention is to provide a magnetic disk cartridge which is small and thin in size and which can be assembled with high efficiency.

Another object of the present invention is to provide a magnetic disk cartridge which provides secure shutter operations.

The present invention provides a magnetic disk cartridge having a case and a magnetic disk rotatably housed in the case, the magnetic disk cartridge comprising:

(i) a shutter for opening and closing window sections provided in said case for insertion of a magnetic head for recording, said shutter being fitted on outer wall surfaces of said case in a manner slidable in a direction approximately normal to the depth direction of apertures of said window sections, (ii) a spring for always urging said shutter to close said window sections, the ends of said spring being engaged with a part of said case and with a part of said shutter, and (iii) an engagement means for engaging at least one end of said spring with said case or said shutter via an engagement member.

In the present invention, the engagement member is formed into a block-like shape, for example into a cubical shape, and secured to at least one end of the spring. On the upper and lower surfaces of the engagement member are provided cylindrical engagement protrusions positioned vertically and symmetrically. The engagement protrusions are fitted into and supported by engagement groove sections which are fabricated integrally with the case or with the shutter and which can be deformed resiliently. Accordingly, after the protrusions of the engagement member secured to one end of the spring is fitted into and supported by the engagement groove sections at the step of fitting the shutter onto the case, the spring can not separate from the case or from the shutter. Then, the other end of the spring is engaged with a hook of the shutter or the case, and the shutter is fitted onto the case. Therefore, in the present invention, the efficiency of the assembly work is improved, and it is possible to obtain secure operations of the shutter

DESCRIPTION OF THE PREFERRED EMBODIMENTS

The present invention will hereinbelow be described in further detail with reference to the accompanying drawings.

Figure 1:
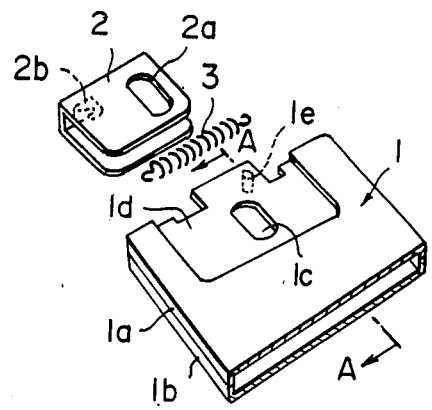
FIG. 1 is a partial perspective view showing the configuration of the shutter section of the conventional magnetic disk cartridge.
Figure 2:
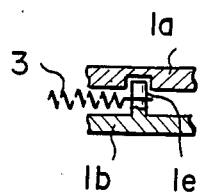
FIG. 2 is a cross-sectional view showing a part of the cross-section taken along line A—A of FIG. 1.
Figure 3:
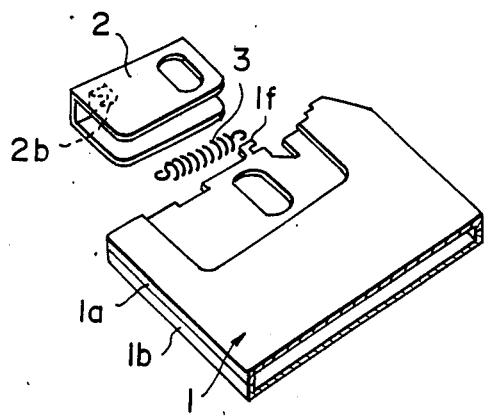
FIG. 3 is a partial perspective view showing another configuration of the shutter of the conventional magnetic disk cartridge.
Figure 4:
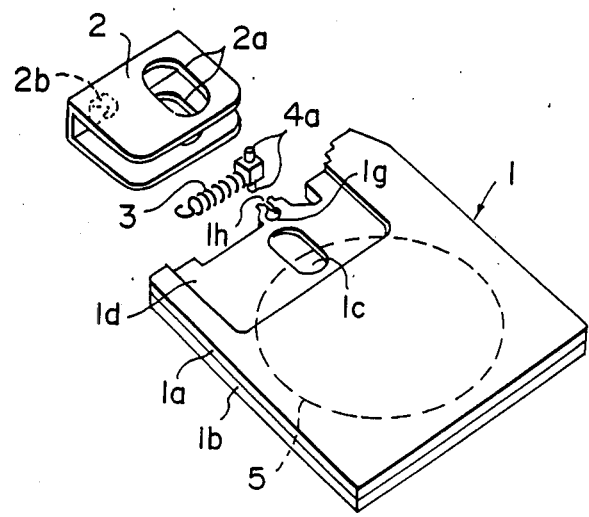
FIG. 4 is a perspective view showing an embodiment of the magnetic disk cartridge in accordance with the present invention.

FIG. 4 shows the internal configuration of the portions near a shutter of the magnetic disk cartridge in accordance with the present invention. Portions other than the engaging sections for the spring for urging the shutter are similar to those shown in FIG. 3. Thus in FIG. 4, similar elements are numbered with the same reference numerals and characters with respect to FIG. 3. A case 1 comprises an upper case half 1a and a lower case half 1b secured integrally by ultrasonic fusion or the like. A magnetic disk 5 is rotatably housed in the case 1. Near the same edge portions of the upper case half 1a and the lower case half 1b are positioned window sections 1c so as to align with each other. Around the window sections 1c are provided step-like sections 1d for receiving the upper side portion and the lower side portion of a shutter 2 having a U-shaped cross-section. Thus the window sections 1c and the step-like sections 1d are respectively symmetrically positioned in the upper case half 1a and the lower case half 1b. The shutter 2 is slidably fitted onto the upper case half 1a and the lower case half 1b so as to grasp the step-like sections 1d therebetween. The upper side portion and the lower side portion of the shutter 2, which are parallel to each other, have window sections 2a which align with the window sections 1c when the shutter 2 is positioned in a predetermined sliding position. At the edge portions of the upper case half 1a and the lower case half 1b where the step-like sections 1d exist are provided engagement groove sections 1g integrally with the upper case half 1a and the lower case half 1b. The engagement groove sections 1g are aligned with each other. Each of the engagement groove sections 1g defines a U-shaped groove having a narrow neck portion 1h, and the opposite side portions of the neck portion 1h can be deformed resiliently. At a part of the shutter 2 is positioned a hook 2b integral therewith. A cubical block 4 is secured to one end of a spring 3, and engagement protrusions 4a of approximately cylindrical shape are symmetrically positioned to stand vertically on the upper surface and the lower surface of the block 4 integrally therewith. When the engagement protrusions 4a are inserted into the engagement groove sections 1g, the neck portions 1h of the engagement groove sections 1g are resiliently expanded by the engagement protrusions 4a. After the engagement protrusions 4a have passed through the neck portions 1h, the neck portions 1h resiliently contract to snugly support the engagement protrusions 4a in the engagement groove sections 1g. The other end of the spring 3 is engaged with the hook 2b of the shutter 2 so that, when the shutter 2 is fitted onto the case 1, the shutter 2 is urged by the spring member 3 to normally close the window sections 1c.

Figure 5:
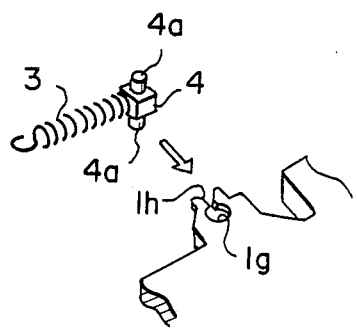
FIG. 5 is a partial perspective view showing the condition before the spring employed in the magnetic disk cartridge of FIG. 4 is fitted into the case.
Figure 6:
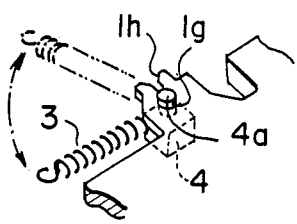
FIG. 6 is a partial perspective view showing the condition after the spring of FIG. 5 is fitted into the case.

When the magnetic disk cartridge of the present invention is assembled, the magnetic disk 5 is housed between the upper case half 1a and the lower case half 1b, and the upper case half 1a and the lower case half 1b are aligned with each other and secured together by ultrasonic fusion or the like. Then, as shown in FIGS. 5 and 6, the engagement protrusions 4a vertically extending from the upper and lower surfaces of the block 4 secured to one end of the spring 3 are inserted into the neck portions of the engagement groove sections 1g of the upper case half 1a and the lower case half 1b by the resilient expansion of the neck portions 1h. Thus the engagement protrusions 4a are fitted into and supported in the engagement groove sections 1g. In this case, since the spring 3 does not disengage from the engagement groove sections 1g even when it is rotated in the direction of the arrow as shown in FIG. 6, it is possible to easily engage the other end of the spring 3 with the hook 2b of the shutter 2. Thereafter, the shutter 2 is fitted onto the step-like sections 1d of the case 1.

After the magnetic disk cartridge is assembled as described above, the shutter 2 is urged by the spring 3 rightwardly in FIG. 4 to close the window sections 1c of the case 1. When a magnetic head for recording (not shown) is to be inserted into the window sections 1c, the shutter 2 is moved leftwardly in FIG. 4 against the rightward urging force of the spring 3 until the window sections 2a of the shutter 2 are aligned with the window sections 1c of the case 1. Then, the shutter 2 is clamped in the window opening position by a clamp section (not shown). The clamp section has such a configuration that the shutter 2 is readily disengaged from the clamp section when necessary.

In the assembling step, it is also possible to first engage the end of the spring 3 having no block 4 with the hook 2b of the shutter 2 and then to insert and fit the engagement protrusions 4a of the block 4 at the other end of the spring 3 into the engagement groove sections 1g of the case 1. It is also possible to secure engagement members such as the blocks 4 to the both ends of the spring 3, to provide the engagement groove sections 1g both in the case 1 and in the shutter 2, and to fit the engagement members into the engagement groove sections 1g of the case 1 and the shutter 2.

What is claimed is:

1. A magetic disk cartridge having a case and a magnetic disk rotatably housed in the case, the magnetic disk cartridge comprising:
    (i) a shutter for opening and closing window sections provided in said case for insertion of a magnetic head for recording, said shutter being fitted on outer wall surfaces of said case in a manner slidable in a direction approximately normal to the depth direction of apertures of said window sections,
    (ii) a spring having two ends for always urging said shutter to close said window sections, the two ends of said spring being engaged respectively with a part of said case and with a part of said shutter, and
    (iii) an engagement means for engaging at least one end of said spring with said case or said shutter via an engagement member, where at least one of said two ends is integrally connected to said engagement means, and wherein said engagement member comprises a block secured to at least one end of said spring and having approximately cylindrical engagement protrusions vertically and symmetrically positioned on the upper surface and the lower surface of said block, and means disposed on said shutter or said case for resiliently receiving and holding in place said protrusions.

2. A magnetic disk cartridge as defined in claim 1 wherein said shutter has a U-shaped cross-section and is provided with window sections in opposite side portions thereof, said window sections being aligned with said window sections of said case when said shutter is positioned in the open position.

3. A magnetic disk cartridge having a case and a magnetic disk rotatably housed in the case, the magnetic disk cartridge comprising:
    (i) a shutter for opening and closing window sections provided in said case for insertion of a magnetic head for recording, said shutter being fitted on outer wall surfaces of said case in a manner slidable in a direction approximately normal to the depth direction of apertures of said window sections,
    (ii) a spring having two ends for always urging said shutter to close said window sections, the two ends of said spring being engaged respectively with a part of said case and with a part of said shutter and,
    (iii) an engagement means for engaging at least one end of said spring with said case or said shutter via an engagement member, wherein said engagement member comprises a block secured to at least one end of said spring and having approximately cylindrical engagement protrusions vertically and symmetrically positioned on the upper surface and the lower surface of said block, wherein said engagement means comprises engagement protrusions fabricated on said engagement member, and engagement groove sections formed integrally with said case or said shutter for resiliently receiving and retaining said engagement protrusions.

4. A magnetic disk cartridge having a case and a magnetic disk rotatably housed in the case, the magnetic disk cartridge comprising:
    (i) a shutter for opening and closing window sections provided in said case for insertion of a magnetic head for recording, said shutter being fitted on outer wall surfaces of said case in a manner slidably in a direction approximately normal to the depth direction of apertures of said window sections,
    (ii) a spring having two ends for always urging said shutter to close said window sections, the two ends of said spring being engaged respectively with a part of said case and with a part of said shutter, and
    (iii) an engagement means for engaging at least one end of said spring with said case or said shutter via an engagement member, wherein said engagement means comprises engagement protrusions fabricated on said engagement member, and engagement groove sections formed integrally with said case or said shutter for resiliently receiving and retaining said engagement protrusions.

5. A magnetic disk cartridge having a case and a magnetic disk rotatably housed in the case, the magnetic disk cartridge comprising:
    (i) a shutter for opening and closing window sections provided in said case for insertion of a magnetic head for recording, said shutter being fitted on outer wall surfaces of said case in a manner slidable in a direction approximately normal to the depth direction of apertures of said window sections,
    (ii) a spring having two ends for always urging said shutter to close said window sections, the two ends of said spring being engaged respectively with a part of said case and with a part of said shutter, and
    (iii) an engagement means for engaging at least one end of said spring with said case or said shutter via an engagement member, wherein said engagement member comprises a block secured to at least one end of said spring and having approximately cylindrical engagement protrusions vertically and symmetrically positioned on the upper surface and the lower surface of said block, and means disposed on said shutter or said case for resiliently receiving and holding in place said protrusions.

* * * * *